United States Patent [19]
Koziol

[11] 3,866,397
[45] Feb. 18, 1975

[54] BRUSH ERADICATOR

[76] Inventor: Robert L. Koziol, 3200 Thomas St., Midland, Tex. 79701

[22] Filed: Nov. 27, 1972

[21] Appl. No.: 309,765

[52] U.S. Cl.................. 56/16.8, 56/11.9, 47/1.43, 47/1.7
[51] Int. Cl............................................. A01d 35/12
[58] Field of Search ............... 56/1, 16.8, 13.6, 327, 56/11.9; 47/1, 1.5, 1.7; 239/DIG. 6, DIG. 8, 172

[56] References Cited
UNITED STATES PATENTS

| | | | |
|---|---|---|---|
| 1,578,162 | 3/1926 | Monthan................................ | 171/8 |
| 2,301,213 | 11/1942 | Kang........................................ | 47/1.7 |
| 2,690,043 | 9/1954 | Marihart........................... | 56/327 A |
| 2,732,675 | 1/1956 | Smith et al................................ | 56/6 |
| 2,734,326 | 2/1956 | Gebhart................................ | 56/13.6 |
| 3,237,388 | 3/1966 | Rishord et al. ....................... | 56/11.9 |
| 3,320,694 | 5/1967 | Biron....................................... | 47/1.5 |
| 3,534,533 | 10/1970 | Luoma.................................. | 56/16.8 |
| 3,584,787 | 6/1971 | Thomason ......................... | 239/121 |
| 3,609,913 | 10/1971 | Rose .................................... | 47/1.43 |

FOREIGN PATENTS OR APPLICATIONS

| 49,831 | 5/1939 | France................................. | 47/1.7 |
|---|---|---|---|

*Primary Examiner*—Russell R. Kinsey
*Attorney, Agent, or Firm*—Wendell Coffee

[57] ABSTRACT

Immediately after unwanted brush is shredded by flails, the exposed stumps are sprayed with herbicide. Flexible flaps or fingers trip on the stumps and activate the herbicide spray; therefore conserving other vegetation and, also, conserving the herbicide.

9 Claims, 4 Drawing Figures

BRUSH ERADICATOR

BACKGROUND OF THE INVENTION

1. FIELD OF THE INVENTION

This invention relates to plant husbandry and more particularly to range management control.

2. DESCRIPTION OF THE PRIOR ART

In range management control, massive machines for shredding unwanted brush such as mesquite are known; for example, the KERSHAW brush machine as manufactured by Kershaw Manufacturing Company.

Also, potent herbicides are known which will kill noxious and unwanted vegetation. Herbicides necessary to kill brush are extremely toxic in their effect on plant life.

RISHOUD, U.S. Pat. No. 3,237,388, discloses a device which cuts brush and then a herbicide is sprayed over the entire area which has been cut.

RUE, U.S. PAT. NO. 1,264,441, discloses a similar device.

ROSE, U.S. PAT. NO. 3,609,913, and MONTHAN, U.S. PAT. NO. 1,578,162, disclose fingers or a detector device by which plants are detected and ROSE sprays the plant after he detects it.

In addition to the above, the following patents were considered in the preparation of this application:

Luoma     3,534,533
McDonald  3,605,908
Bezzerides 3,176,778

SUMMARY OF THE INVENTION

New and Different Function

I have provided a device for eradicating unwanted brush which shreds the brush and then selectively sprays the cut stumps with herbicide. Several potent herbicides, known to the art and commercially available on the market, are suitable for this purpose. Because of their potency ad expense, it is desirable that they not be spread over the entire area. To do this is would also kill or stunt much of the desirable vegetation. This is contrary to good conservative range management and does ecological harm. Ecology is benefited by the removal of noxious and undesirable brush, but there is no benefit in laying barren the entire land.

I achieve my desirable results by placing a spray header upon the machine which shreds the brush. However, instead of spraying constantly, I have arranged the spray nozzles in groups and each group of four spray nozzles is actuated by a feeler finger or flap. The flap is set to feel anything that projects as high as the stumps left by the shredder. The spray nozzles are directed to the to the area of the feeler fingers so when the feeler finger detects a stump, this stump and the immediate area only around the stump is sprayed, thus efficiently, killing the brush, but not causing any ecological damage. In addition, substantial savings are made in the cost of herbicides, however, more important is the fact that beneficial plant growth is promoted.

OBJECTS OF THIS INVENTION.

An object of this invention is to kill undesirable and noxious brush while leaving desirable and beneficial plant growth unharmed.

Other objects are to achieve the above with a device that is sturdy, compact, durable, lightweight, simple, safe, efficient, versatile, and reliable, yet inexpensive and easy to manufacture, install, adjust, operate, and maintain.

Further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

Figure 1:
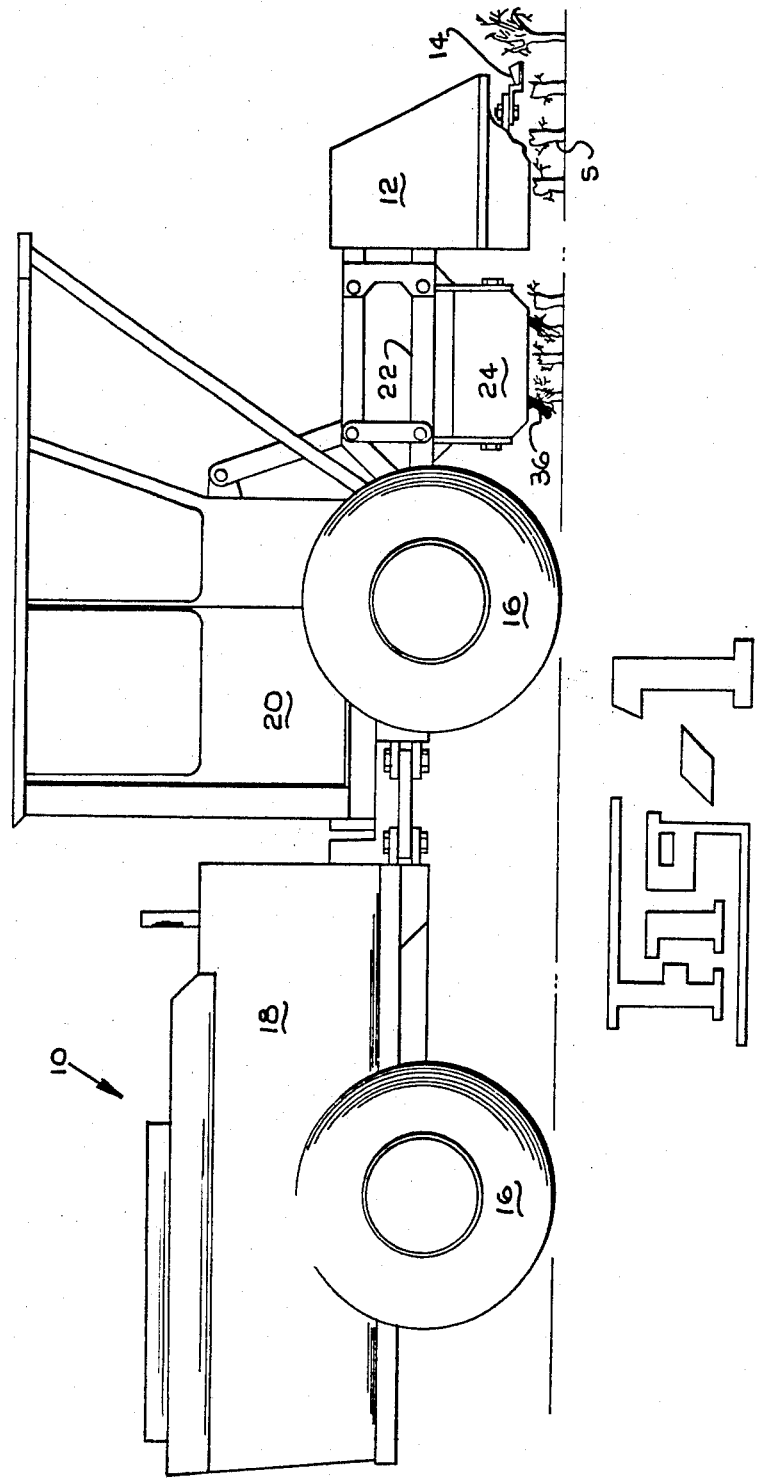
FIG. 1 is a side elevational view of a machine according to this invention.

DESCRIPTION OF THE PREFERRED EMBODIMENT:

Referring more particularly to the drawing, particularly FIG. 1, there may be seen a vehicle 10 which carries a cutter head 12 having brush cutter knives 14. The vehicle 10 has ground engaging wheels 16 and power unit 18 coupled to operator's cab 20. The cutter head 12 is supported by linkage 22 so the operator may control the height of the head 12. This in turn controls the height of the knives 14. This control regulates the height stumps S are left.

It will be understood that the equipment described to this point was known and commercially available on the market before my invention.

To this known equipment, I have added spray head 24. The spray head includes heavy metal plate 26 which has a flat bottom and two sides 28. The metal plate is quite heavy because, normally, although the cutter heads with the knives 14 are about the same level, it is still possible that the head might strike or drag across rocks or uncut stumps, thus making it necessary for it to be quite sturdy. The sides are bolted to brackets 30 which are also bolted to the linkage 22. As may be seen, the spray header 24 is mounted immediately behind the cutter header 12. Also, inasmuch as it is mounted to the same linkage 22 as the cutter head 12, it will be raised and lowered with the cutter head 12 at the discretion of the operator in the cab 20.

Figure 4:
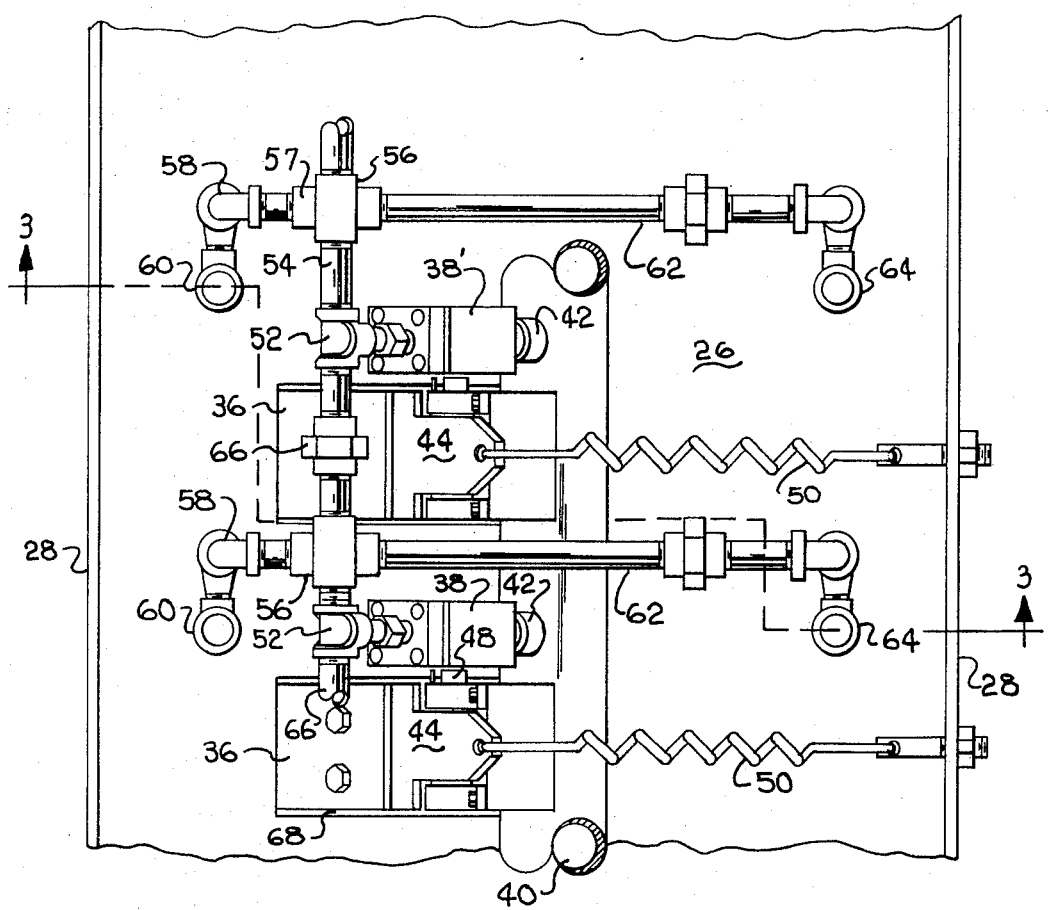
FIG. 4 is a top plan view of a portion of the spray header.

The spray header contains forward spray nozzles 32 and after spray nozzles 34. There would be as many sets of forward spray nozzles 32 and after spray nozzles 34 as needed for the width of the machine. Each of the spray nozzles is controlled by feeler finger or flap 36. When the flap 36 strikes a stump, it actuates valve 38 (FIG. 4) to spray herbicide upon the stump S.

Header pipe 40 is connected to a pump connected to a reservoir of herbicide (not shown). Therefore, for the spray head 24, the header pipe 40 may be considered a source of supply of liquid herbicide under pressure. In each of the several sets of spray nozzles, nipple 42 attaches the valve 38 to the header pipe 40. The flap 36 is constructed of a flexible material such as rubber and is connected to lever 44 by bolts 46. The lever 44 is attached to the valve stem 48. Rotation of the valve stem 48 opens the valve 38. The valve is normally biased in the closed position by spring 50 which extends from one side of the lever 44 to side 28 of the spray head 24. The tee 52 is attached to the outlet of the valve 38.

Nipple 54 attaches shuttle valve 56 to the tee 52. Shuttle valves such as 56 are known to the art and were commercially available on the market before my invention. These valves, which have pressure thereon, will permit flow from either side. I.e., referring to FIG. 4, if the valve 38 is open and the valve 38' is closed, then the shuttle valve 50 will receive liquid from the valve 38, but will not receive liquid from the valve 38'. Conversly, if the valve 38' is open, the shuttle valve will receive liquid therefrom, but will not permit the liquid to back-flow to the valve 38 which is closed. An example illustrating a shuttle valve in another location or environment is shown in U.S. Pat. No. 3,451,424, GARDNER ET AL. Forward connection 59 connects the shuttle valve 56 through tee 57 to the forward spray nozzle 32 which is located immediately over opening 60 in the bottom plate 26. After connection 62 connects the after opening of the tee 57 on shuttle valve 56 to the after nozzle 34, which sprays through after opening 64.

The other side of the shuttle valve 56 is connected to conduit 66 which connects to the next adjacent tee 52 and valve 38. The conduit 66 includes a union joint for assembly. The flap 36 operates through opening 68 in the bottom plate 26.

Figure 2:
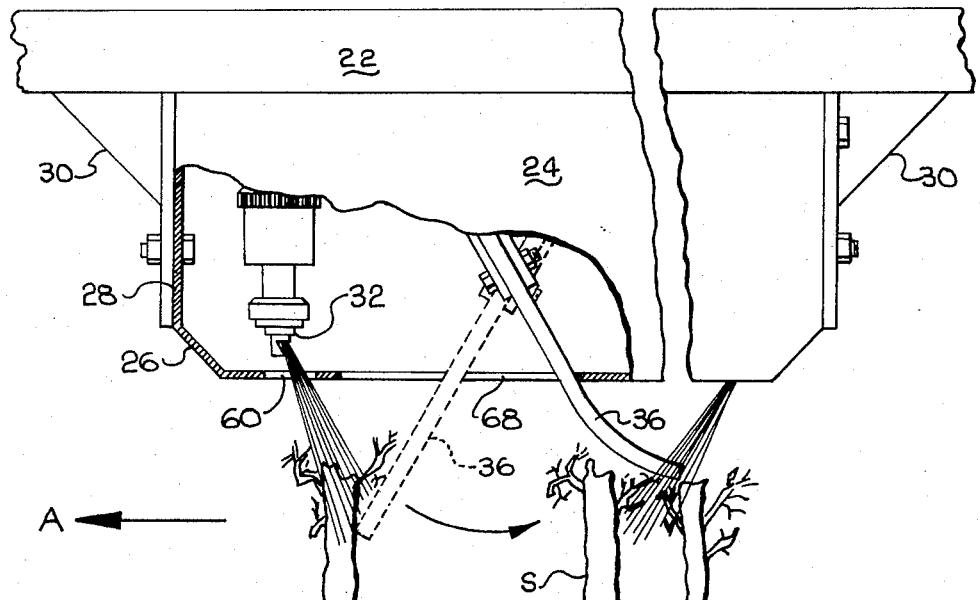
FIG. 2 is a side elevational view of the spray header partially broken away.
Figure 3:
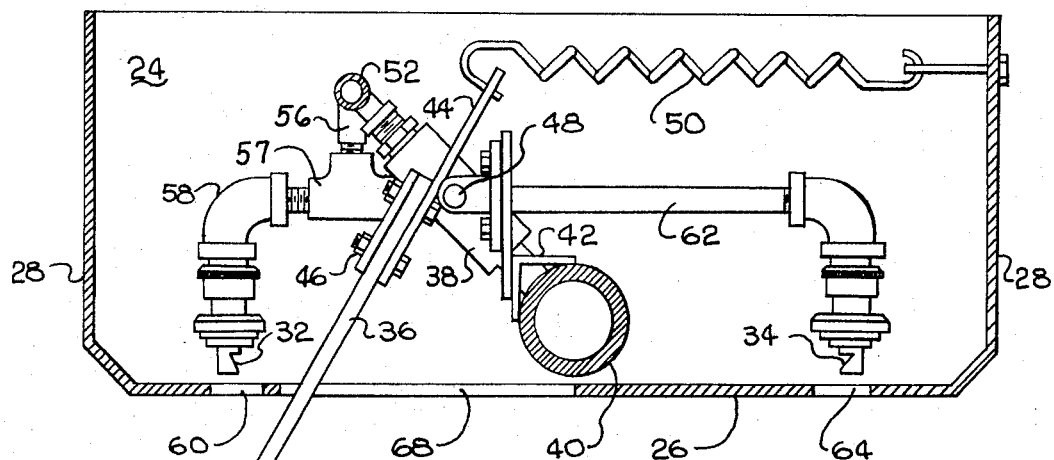
FIG. 3 is a sectional view of the spray header.

Referring more particularly to FIG. 2, the header 24 will move in the direction of arrow A. With the flap in the position as shown in dotted line in FIG. 2, there will be no spray, but when the flap 36 strikes a stump S, it will move to the rearward position. Then, lever 44 rotates the valve stem 48 and actuates the valve 38. When the valve 38 opens, it places fluid on two shuttle valves 56 opening both of them on that side so herbicide under pressure is furnished to each of the tees 57 on either side of the flap 36 which has been tripped. When any one of the flaps 36 is tripped, herbicide is provided to four spray nozzles, i.e., to the two forward spray nozzles 32 and the two after spray nozzles 34 on either side of the flap 44. The area around the flap 36, which is tripped, is thoroughly sprayed, but no other growth is sprayed.

If two adjacent flaps 36 are tripped, six spray nozzles will be opened. The spray nozzles will emit a spray of herbicide directly upon the stump S so the stump is killed, but only very small amount of vegetation immediately surrounding the stump will be killed. Of course, if a rock or other material is on the ground and extends upward so it is just below the location of the knives 14 and the cutter head 12, it will trip the flap 36 and be sprayed. However, this results in only minimum loss of herbicide and minimum killing of plant growth.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. In a brush eradicator including
   a. a vehicle supported by
   b. ground engaging wheels,
   c. a power unit on said vehicle for driving same,
   d. a cutter head on said vehicle,
   e. knives on said cutter head for cutting brush,
   f. linkage connecting said cutter head to said vehicle,
   g. means operatively associated with said linkage for raising and lowering said cutter head,
   h. The improvement in combination with the above comprising:
   j. a spray head attached to said vehicle behind said cutter head,
   k. said spray head including a plurality of flaps projecting below the spray head,
   m. said flaps projecting to an elevation lower than the knives of said cutter head,
   n. a plurality of spray nozzles on said spray head,
   o. a source of herbicide under pressure,
   p. a plurality of valves connected to said source of herbicide under pressure,
   q. each of said flaps connected to one of said valves in operative relationship thereto,
   r. at least one spray nozzle connected to each of said valves,
   s. said spray nozzle located proximate the flap which is connected to the valve.

2. The invention as defined in claim 1 with an additional limitation of
   t. said spray head connected to said linkage so that the spray head is raised and lowered with the cutter head.

3. The invention as defined in claim 1 with additional limitations of
   t. at least two nozzles for each flap,
   v. one of said nozzles in front of the flap and one of said nozzles behind the flap.

4. The invention as defined in claim 1, with an additional limitation of
   t. said nozzles being directional nozzles being directed toward said flap.

5. The invention as defined in claim 1 with additional limitations of
   t. said source of herbacide under pressure being in the form of a header pipe,
   u. said header pipe extending transversely across said spray head,
   v. each of said valves extending in an upward direction from said spray header,
   w. each of said valves being connected to two shuttle valves,
   x. each of said shuttle valves being connected to at least one of said nozzles.

6. The invention as defined in claim 5 with an additional limitation of
   y. said spray head connected to said linkage so that the spray head is raised and lowered with the cutter head.

7. The invention as defined in claim 5 with additional limitations of
   y. at least two nozzles for each shuttle valve,
   z. one of said nozzles in front of the flap and one of said nozzles behind the flap.

8. The invention as defined in claim 7 with an additional limitation of
   aa. said nozzles being directional nozzles being directed toward said flap.

9. The invention as defined in claim 8 with an additional limitation of
   bb. said spray head connected to said linkage so that the spray head is raised and lowered with the cutter head.

* * * * *